No. 628,302. Patented July 4, 1899.
H. B. CARLTON.
PHOTOGRAPHIC CAMERA.
(Application filed Feb. 11, 1899.)

(No Model.) 2 Sheets—Sheet I.

Witnesses.

Inventor:
Harvey B. Carlton.
By James L. Norris
Atty.

THE NORRIS PETERS CO., PHOTO-LITHO., WASHINGTON, D. C.

No. 628,302. Patented July 4, 1899.
H. B. CARLTON.
PHOTOGRAPHIC CAMERA.
(Application filed Feb. 11, 1899.)
(No Model.) 2 Sheets—Sheet 2.
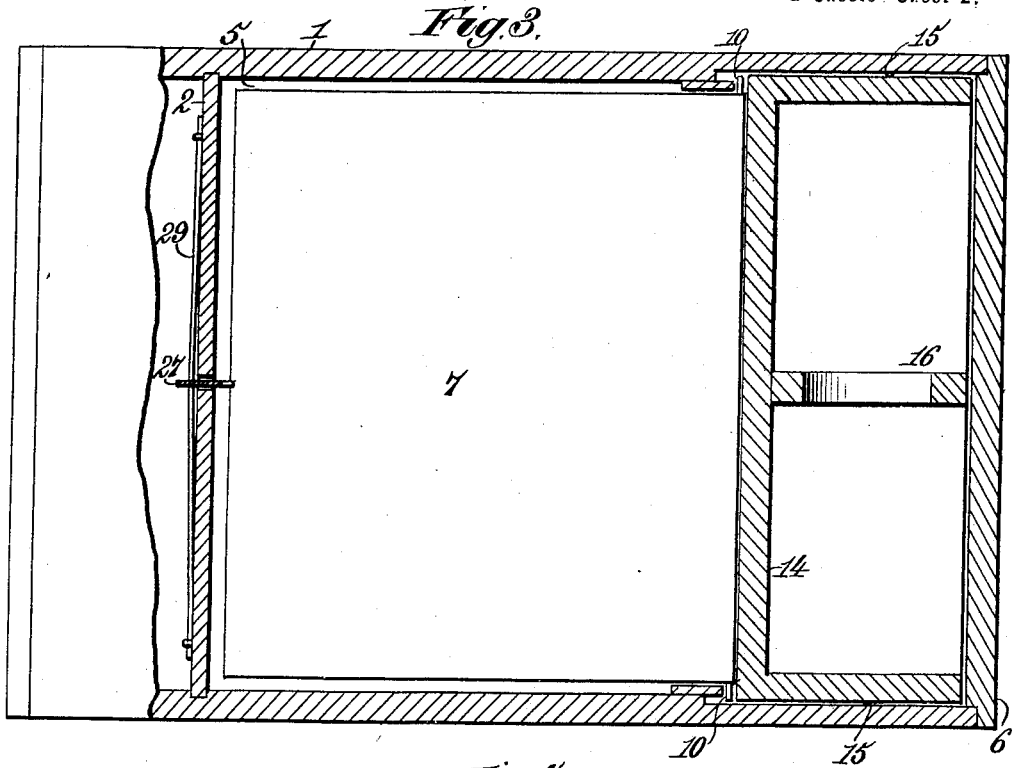
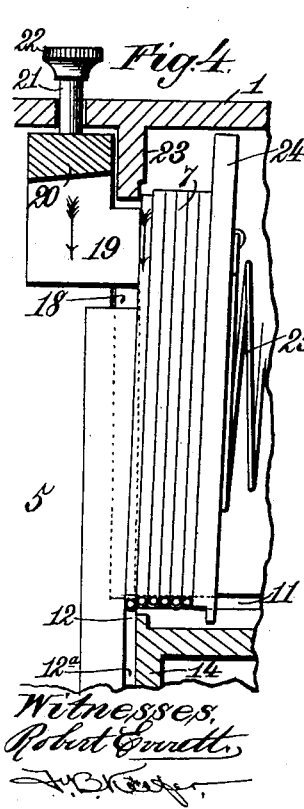
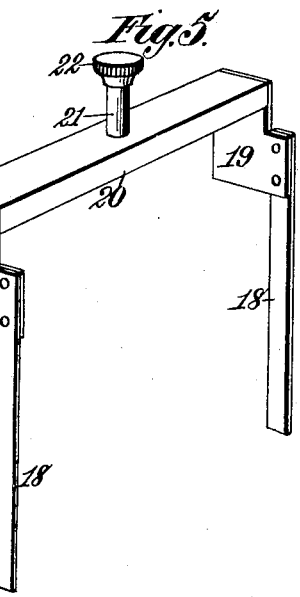
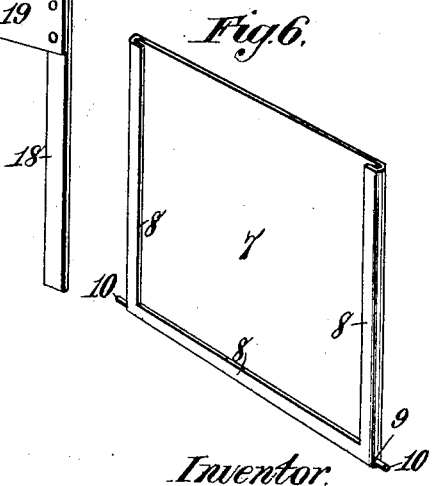
Witnesses
Robert Everett
Inventor
Harvey B. Carlton,
By
James L. Norris
Atty.

UNITED STATES PATENT OFFICE.

HARVEY B. CARLTON, OF ROCHESTER, NEW YORK.

PHOTOGRAPHIC CAMERA.

SPECIFICATION forming part of Letters Patent No. 628,302, dated July 4, 1899.

Application filed February 11, 1899. Serial No. 705,308. (No model.)

*To all whom it may concern:*

Be it known that I, HARVEY B. CARLTON, a citizen of the United States, residing at Rochester, in the county of Monroe and State of New York, have invented new and useful Improvements in Photographic Cameras, of which the following is a specification.

This invention relates to photographic cameras, and especially to that type of magazine-cameras in which a plurality of sensitized plates are arranged one behind the other in the rear end of the camera and are moved forward to successively bring the foremost plate into the focus of the lens, and after each plate has been exposed it is moved down and out of the field of the objective to bring the next plate into position for exposure.

My invention has for its object to provide improved mechanism for successively bringing the plates into position for exposure and for moving them after exposure out of the field of the objective, and also has for its object to improve and cheapen the construction and simplify the operation of this class of cameras generally.

To these ends my invention consists in the features and in the construction, combination, and arrangement of parts hereinafter described, and particularly pointed out in the claims following the description, reference being had to the accompanying drawings, forming a part of this specification, wherein—

Figure 1:
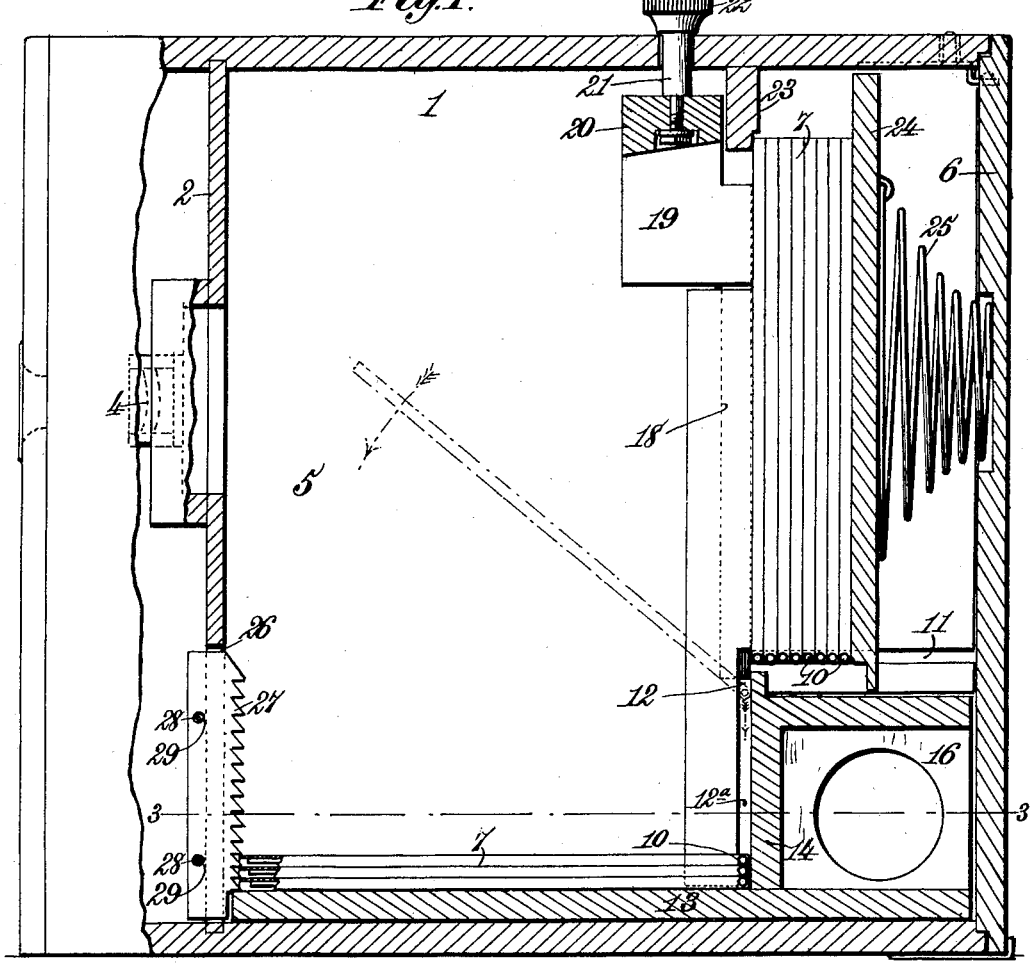
Figure 2:
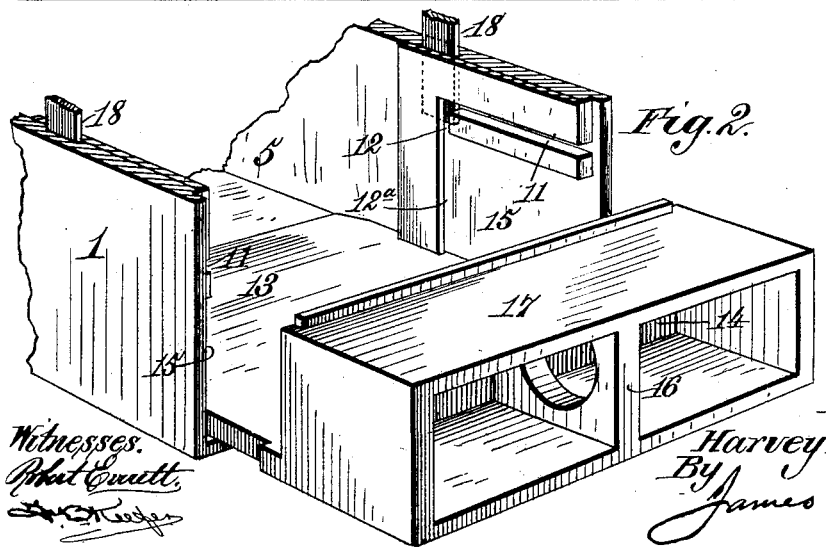

Figure 1 is a vertical sectional view of my improved camera. Fig. 2 is a detail perspective view of a portion thereof. Fig. 3 is a horizontal sectional view taken on the line 3 3 of Fig. 1. Fig. 4 is a detail view illustrating the manner of successively feeding forward the plates. Fig. 5 is a detail view of the bolts, the cross-bar uniting them, and the operating-handle; and Fig. 6 is a detail perspective view of one of the plate-holders.

Referring to the drawings, the numeral 1 indicates the camera-box, provided at its front end with the usual view-aperture, sight-finders, and shutter, which form no part of the present invention. Arranged in the front portion of the camera is a light-tight partition 2, in which is fixed the lens-tube, carrying the lens 4. A chamber 5 is thus formed in the rear of the camera, which forms a magazine for the exposed and unexposed plates, said magazine being closed light-tight by a lid or cover 6, removably fitted in the end of the camera and held in place by catches or fastenings of any suitable or preferred construction. The plates are separately carried by plate-holders 7, each of said plate-holders consisting of a thin piece of sheet metal bent inwardly at its bottom and sides or edges to form lips or flanges 8, a rod or wire 9 being disposed beneath the bottom flange and projecting at its opposite ends beyond the edges of the plate-holder to form trunnions 10, for the purpose hereinafter explained. The sensitized plate is slipped in the holder beneath the flanges 8 and is held therein without the assistance of any fastening devices. It will be understood that a number of such plate-holders will be provided for each camera, and while I have described them formed of sheet metal it will be apparent that other materials may be employed for the purpose.

Formed in each side of the camera-box, at the rear end and at a suitable distance above the bottom thereof, is a horizontal groove or way 11, which communicates at its forward or inner end with a vertical groove or way 12. Resting on the bottom of the magazine-chamber 5 is a slide 13, provided near its rear end with an upwardly-projecting transverse partition 14, which extends from side to side of the camera. The sides of the camera beneath the horizontal grooves 11 are recessed or cut away, as at 15, for the reception of the ends of the partition and permit the slide to be slipped into place into the camera and withdrawn therefrom. The slide at its rear end is provided with a finger-piece or handle 16 of any suitable construction, by means of which the slide may be withdrawn from and inserted in the camera, and with a horizontal shelf 17 to support the follower hereinafter described. When the slide is in place in the camera, the transverse partition 14 forms one wall of a vertical groove 12$^a$, the other wall of which is formed by the side of the camera, and said groove 12$^a$ is in alinement with and forms a continuation of the groove 12. Arranged to slide vertically in each of the grooves 12 is a bar or bolt 18, said bolts at their upper ends being provided with rigid arms or forward extensions 19, that are respectively attached to a cross-bar 20. Attached centrally to the cross-bar 20 and projecting through the top of the camera is a rod or pin 21, provided at its outer end with a knob or handle 22. By raising and depressing the knob 22 the bars or bolts 18 will manifestly be raised and lowered in the grooves 12. The bolts 18 are of such length that when the knob is forced in or down their lower ends will project down below the horizontal grooves 11 and close the inner ends of the latter. Attached to the under side of the top of the camera immediately in rear of the cross-bar 20 is a transverse strip, batten, or abutment 23, against which the upper edge of the foremost plate-holder is adapted to rest.

The plate-holders are arranged vertically one behind the other in the magazine, with their open sides facing the lens, the trunnions 10 of the plate-holders resting in the horizontal grooves 11. Arranged behind the rearmost plate-holder and resting at its lowermost edge on the shelf 17 of the slide is a follower 24, to the rear side of which is attached one end of a coiled spring 25, the other end of which bears against the lid or cover 6. When the lid or cover is fastened in place, the spring 25 is compressed and operated to press the plate-holders forward in the grooves or ways 11.

Formed in the partition 2 is a vertical slot 26, in which is arranged a rack-bar 27, the toothed edge of which projects into the magazine-chamber, while its opposite edge projects into the front of the compartment. Formed in the rack-bar 27, near its opposite ends, are two perforations 28, through which are passed wire springs 29, that are attached at one or both ends to the forward side of the partition 2 and operate to force the toothed edge of the rack-bar rearwardly into the magazine-chamber and into engagement with the edges of the plate-holders as they are lowered after exposure.

The operation of the device is as follows: The holders are first filled by placing in each a sensitized plate, with the film or sensitized side toward the open side of the holder, and the plate-holders are then inserted in the magazine in the position shown, with the trunnions 10 resting in the grooves or ways 11; after which the follower 24 is arranged behind the plate-holders and the lid or cover 6 fastened in place, thus compressing the spring 25 and closing the camera light-tight. The spring operates to feed the plate-holders forward in the grooves 11, the trunnions 10 of the foremost plate-holder pressing against the lower sides of the bolts 18, which close the inner ends of said grooves or ways, and the upper edge of said plate-holder resting against the transverse ledge or abutment 23. Now let it be assumed that the foremost plate has been exposed to take a picture. Then to remove the exposed plate and bring the next succeeding unexposed plate into the faces of the lens in readiness for the next exposure the operator raises the knob 22, thus lifting the bolts 18. The moment the lower ends of the bolts rise above the inner ends of the grooves or ways 11 the spring 25 operates to force the lower edge of the foremost plate-holder forward and the trunnions thereof are forced into the grooves or ways 12, which are just wide enough to receive the trunnions of but one plate-holder at a time. The foremost plate-holder is now held perpendicularly above the grooves or ways $12^a$ by the spring pressing it forward against two fixed points of support or rest—viz., the upper edge of the plate-holder bears against the ledge or abutment 23 and at its lower edge the trunnions bear against the foremost walls of the grooves or ways 12, in which position it is held by the pressure of the spring-pressed follower. The knob 22 is next depressed, forcing down the bolts 18, and as the latter descend their lower ends engage the trunnions of the foremost plate-holder and push them a short distance down the grooves or ways 12. The upper edge of the plate-holder is thus drawn down below the lowermost edge of the ledge or abutment 23, whereupon the pressure of the spring-follower swings the upper edge of the plate-holder forward, and the latter being thus deprived of one of its points of support it at the same time drops vertically, the trunnions descending in the grooves or ways $12^a$. The plate-holder thus simultaneously swings forward and downward and drops horizontally onto the slide 13, while at the same time the next succeeding plate-holder is pressed forward, carrying its contained plate into the focus of the lens in readiness for another exposure. In this manner all the plates may be exposed successively. As each plate-holder drops down onto the slide or onto the plate-holders previously dropped onto the slide its foremost edge engages the toothed edge of the rack-bar 27, which latter guides and permits the plate-holder to drop into place, after which its springs force the rack-bar back into normal position, and one of the teeth thereof engages the edge of the plate-holder and holds the plate-holder steady and prevents its displacement or shaking about within the magazine, no matter how carelessly the camera may be carried or handled. When the plate-holders are dropped down onto the slide after exposure, the plates face toward the bottom of the camera, whereby they are protected from reflected light or stray or fugitive rays of light when the subsequent exposure is made. When all the plates or any number of them have been exposed and it is desired to remove them from the camera for development, it is only necessary to remove the lid or cover 6 and withdraw the slide, when the plate-holders, carrying the exposed plates, will be withdrawn collectively with the slide, and this is rendered possible by having the transverse partition 14 form the rear wall of the grooves or ways $12^a$, whereby when the slide is withdrawn, carrying with it the partition 14, there is no obstruction in the path of the trunnions 10 of the plate-holders.

Having described my invention, what I claim is—

1. In a camera, the combination with a magazine-chamber having horizontal ways at its opposite sides in which are adapted to travel laterally-projecting trunnions on the plate-holders, and vertical ways communicating with the inner ends of the horizontal ways, of vertically-movable bolts arranged in the vertical ways and normally closing said inner ends of the horizontal ways, means for raising and lowering the bolts to open the inner ends of the horizontal ways and force the trunnions of the foremost plate-holder down the vertical ways, and a ledge or abutment in the top of the magazine-chamber for the upper edge of the foremost plate-holder to rest against, substantially as described.

2. In a camera, the combination with a magazine-chamber having horizontal ways at its sides in which are adapted to travel laterally-projecting trunnions on the plate-holders, and vertical ways communicating with the inner ends of the horizontal ways, of vertically-movable bolts arranged in the vertical ways and normally closing said inner ends of the horizontal ways, means for raising and lowering the bolts to open the inner ends of the horizontal ways and force the trunnions of the foremost plate-holder down the vertical ways, a ledge or abutment in the top of the magazine for the upper edge of the foremost plate to rest against, and a spring-follower arranged in rear of the plate-holders and operating to feed the latter forward, substantially as described.

3. In a camera, the combination with a magazine-chamber having horizontal ways at its sides in which are adapted to travel laterally-projecting trunnions on the plate-holders, and vertical ways communicating with the inner ends of the horizontal ways, of a ledge or abutment in the top of the magazine for the upper edge of the foremost plate-holder to rest against, vertically-movable bolts arranged in the vertical ways and normally closing said inner ends of the horizontal ways, a cross-bar rigidly connecting the upper ends of said bolts, a pin or rod connected to said cross-bar and projecting through the top of the camera, whereby said bolts may be raised to open the inner ends of the horizontal ways to permit the trunnions of the foremost plate-holder to enter the vertical ways beneath the bolts, and depressed to force said trunnions down the vertical ways to disengage the upper edge of the plate-holder from the ledge or abutment, substantially as described.

4. In a camera, the combination with a magazine-chamber having horizontal ways at its sides in which are adapted to travel laterally-projecting trunnions on the plate-holders, and vertical ways communicating intermediate their ends with the inner or forward ends of the horizontal ways, of a ledge or abutment in the top of the magazine for the upper edge of the foremost plate-holder to rest against, a spring for pressing the plate-holders forward, vertically-movable slides arranged in the vertical ways and normally closing the inner or forward ends of the horizontal ways and means for raising and lowering the slide to open the inner ends of the horizontal ways and force the trunnions of the foremost plate-holder down the vertical ways to disengage its upper edge from the ledge or abutment, substantially as described.

5. In a camera, the combination with a magazine-chamber cut away or recessed at its opposite sides as shown, said chamber having horizontal ways at its sides in which are adapted to travel laterally-projecting trunnions on the plate-holders, and vertical ways communicating with the inner ends of the horizontal ways, of a ledge or abutment in the top of the magazine for the upper edge of the foremost plate-holder to rest against, a spring for pressing the plate-holders forward, means for normally closing the inner ends of the horizontal ways, means for forcing the trunnions of the foremost plate-holder down the vertical ways to disengage its upper edge from the edge or abutment, and a removable slide arranged on the bottom of the magazine-chamber on which the plate-holders are arranged to drop, said slide having a transverse partition forming the rear walls of the vertical ways, substantially as described.

6. In a camera, the combination with a magazine-chamber cut away or recessed at its opposite sides as shown, said chamber having horizontal ways above its recessed portions in which are adapted to travel laterally-projecting trunnions on the plate-holders, and vertical ways communicating with the inner ends of the horizontal ways, of a ledge or abutment in the top of the magazine for the upper edge of the foremost plate-holder to rest against, a spring follower for pressing the plate-holders forward, means for normally closing the inner ends of the horizontal ways, means for forcing the trunnions of the foremost plate-holder down the vertical ways to disengage its upper edge from the ledge or abutment, and a removable slide arranged on the bottom of the magazine-chamber on which the plate-holders are adapted to drop, said slide having a transverse portion forming the rear walls of the vertical ways, and a horizontal shelf on which the follower rests, substantially as described.

In testimony whereof I have hereunto set my hand in presence of two subscribing witnesses.

HARVEY B. CARLTON.

Witnesses:
EDWARD WEBSTER,
ROY C. WEBSTER.